United States Patent [19]

Owens

[11] Patent Number: 5,049,110

[45] Date of Patent: Sep. 17, 1991

[54] PORTABLE GAME SUPPORT

[76] Inventor: James M. Owens, P.O. Box 1073, Hwy. 1204, Ball, La. 71405

[21] Appl. No.: 487,844

[22] Filed: Mar. 5, 1990

[51] Int. Cl.$^5$ ............................................. A22B 1/00
[52] U.S. Cl. ................................. 452/187; 452/185; 452/192; 182/133
[58] Field of Search ................ 452/187, 185, 189–192; 182/133

[56] References Cited

U.S. PATENT DOCUMENTS

| | | | |
|---|---|---|---|
| 957,344 | 5/1910 | Kaiseruk | 452/187 |
| 1,530,675 | 3/1925 | Janes | 294/79 |
| 2,842,300 | 7/1958 | Johnson | 182/133 |
| 3,727,723 | 4/1973 | Pitcairin et al. | 182/133 |
| 3,854,168 | 12/1974 | Bradley | 452/189 |
| 4,407,391 | 10/1983 | Greenway | 182/133 |
| 4,506,411 | 3/1985 | Ivy | 452/187 |
| 4,595,078 | 6/1986 | Greenway | 182/133 |
| 4,903,372 | 2/1990 | Jones | 452/187 |

*Primary Examiner*—Willis Little
*Attorney, Agent, or Firm*—John M. Harrison

[57] ABSTRACT

A portable game support for suspending game from a vertical support such as a post or tree, which game support includes a support frame having spaced legs for skirting the tree, a connector bar spanning the legs for engaging one side of the tree, a brace bar pivotally attached to the forward end of the support frame for adjustably engaging the tree beneath the connector bar and a V-shaped rear retainer bar adjustably secured to the legs of the support frame for engaging the opposite side of the tree and cooperating with the connector bar for maintaining the support frame on the tree at a selected height. A V-shaped front retainer may also be adjustably secured to the legs adjacent to the connector bar and overlapping the rear retainer for engaging the tree under circumstances where the tree upon which the portable game support is mounted is relatively small in diameter. An engaging frame is suspended from the support frame for receiving the legs of an animal to be dressed and suspending the carcass in a dressing configuration. In a most preferred embodiment, a pulley is suspended from the forward portion of the support frame and supports the engaging frame, which is fitted with a pair of spaced frame hooks for engaging the legs of the animal, wherein the animal may be hoisted upwardly by operation of the pulley and the engaging frame to facilitate suspension and dressing of the animal at a selected height.

20 Claims, 1 Drawing Sheet

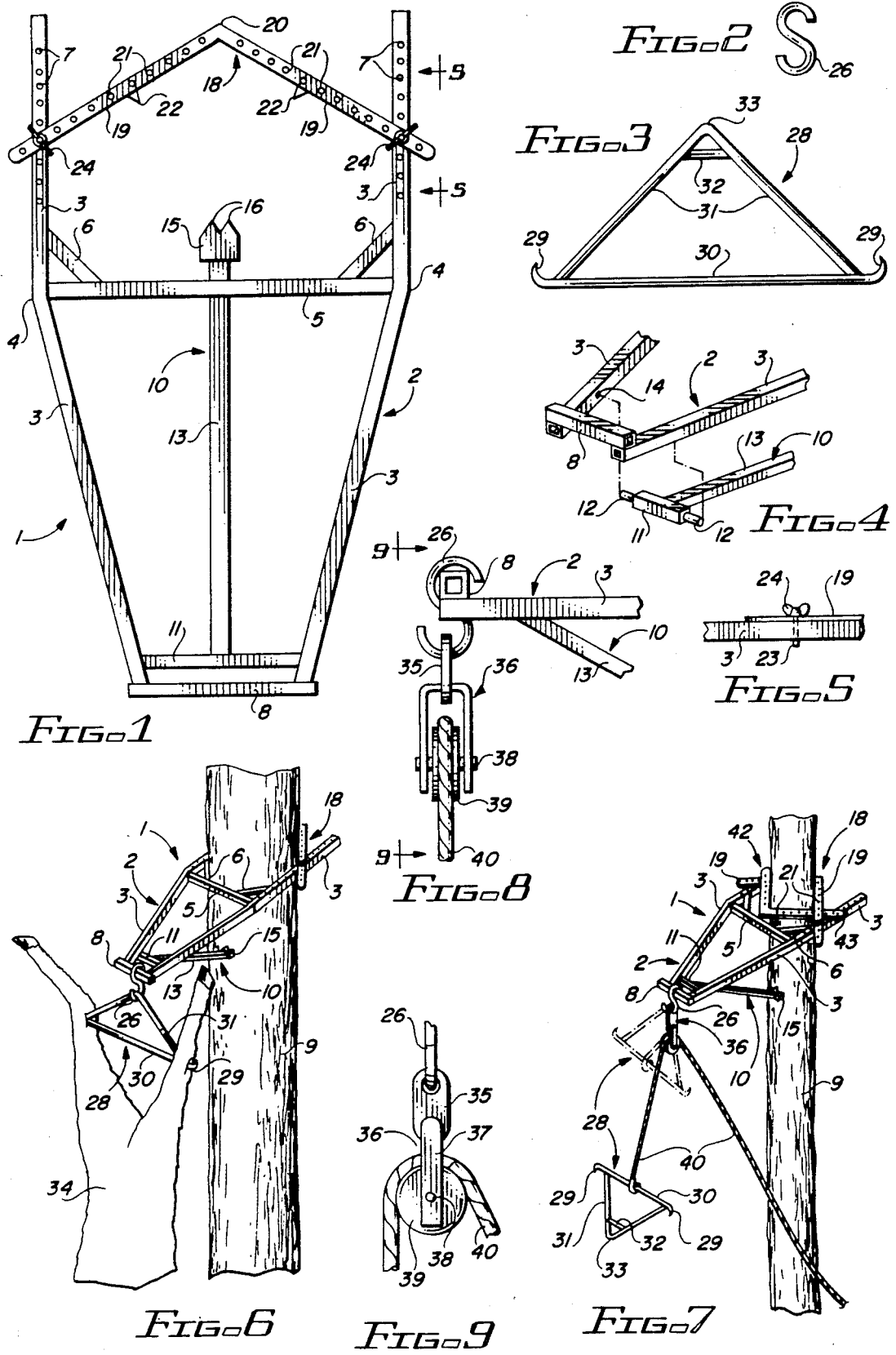

PORTABLE GAME SUPPORT

BACKGROUND OF THE INVENTION

Field of the Invention

This invention relates to game dressing devices and more particularly, to a portable game support which is characterized by a support frame connected at the forward end and having a pair of spaced, parallel legs extending rearwardly for spanning a tree, post or other elongated, vertical support, a central frame connector spanning the legs for engaging one side of the vertical support and a V-shaped rear retainer adjustably attached to the parallel legs for engaging the opposite side of the vertical support and securing the support frame on the vertical support at a selected height. In a preferred embodiment, one end of a support frame brace is pivotally attached to the front end of the support frame and the opposite end of the support frame brace extends downwardly in angular relationship with respect to the support frame for engaging the vertical support, in order to further stabilize the support frame on the vertical support. A V-shaped front retainer may be adjustably mounted on the parallel legs adjacent to the central frame connector in cooperation with the rear retainer for mounting the support frame on a vertical support such as a tree, having a small diameter. A pulley assembly may also be attached to the forward end of the support frame by means of an S-hook, with one end of a pulley rope extending around the rotatable pulley sheave and secured to an engaging frame provided with spaced frame hooks for engaging the legs of an animal to be dressed. The animal is raised to a desired height by operating the pulley to extend the engaging frame in close proximity to the S-hook, wherein the engaging frame is then rotated through an angle of 90 degrees and manipulated to engage the S-hook and support the animal in dressing configuration. Alternatively, the engaging frame can be attached directly to the S-hook without using the pulley, to suspend the animal carcass directly from the engaging frame.

One of the problems realized in the dressing of game such as deer, elk and the like, is that of orienting the game, usually in a head-down, vertical position to facilitate efficient dressing and skinning. Since wild game should be dressed promptly after the kill in order to insure meat of high quality, it is imperative to quickly place the game in a proper configuration for efficient skinning, cleaning and dressing. This is particularly important under circumstances where the game is to be skinned, since it is desirable to carefully remove the skin so that the hair does not touch the meat to be dressed, to avoid contaminating the meat.

An early device for dressing hogs is detailed in U.S. Pat. No. 957,344, dated May 10, 1910, to J. A. Kaiserlik, entitled "Hog Gambrel". The hog gambrel includes a frame having two lateral arms, the ends of which are provided with downwardly and outwardly inclined spreaders having elongated eyelets in which the shanks of hooks are freely engaged. The frame is provided with an upper loop on a substantially horizontal bar and is suspended from a carrier having a hook which forms a coupling support for the frame. The carrier is provided with a grooved anti-friction wheel which travels upon a track to facilitate movement of the carcass from place to place while it is suspended from the gambrel. U.S. Pat. No. 1,530,675, dated Mar. 24, 1925, to C. Janes, details a "Collapsible Animal Skinning Support". The support includes a hook adapted for suspension from a pole, tree or other support and an A-shaped frame pivotally attached to the hook, wherein a horizontal member mounted in the A-frame is adjustable to spread the legs of the A-frame to a desired angle. Hooks attached to the bottom ends of the A-frame legs are adapted to receive the legs of an animal to be dressed. A "Hand-Operated Pole Climbing Aid" is detailed in U.S. Pat. No. 2,842,300, dated July 8, 1958, to J. M. Johnson. The pole climbing aid includes a pair of lever arms which extend divergently and are interconnected by an arcuate central connecting portion provided with teeth. The teeth are adapted to bite into the wood or other material of the pole being climbed and the lever arms are provided with angulated portions to vertically offset and raise the central connecting portion from the ends of the lever arms. These lever arm ends are upwardly arcuately curved and are fitted with eyelets which are arranged to permit easy attachment of the safety belt and to retain the safety belt in a secure manner. Brace bars are also provided in the climbing aid for strengthening the lever arms. U.S. Pat. No. 3,727,723, dated Apr. 17, 1973, to Laren Pitcairin, et al, details a "Height-Adjustable Tree Seat". The apparatus includes a seat having a manually operable mechanism designed such that a person seated thereon can raise and lower himself along a vertical member such as a pole or tree. Height is determined by controlling rotation of a positioning wheel having a resilient peripheral surface in frictional engagement with the tree or pole. A "Pole Climber's Safety Device" is detailed in U.S. Pat. No. 4,407,391, dated Oct. 4, 1983, to Peter R. Greenway, et al. The device includes a closed yoke for encompassing a pole, the yoke providing an attachment plate for attaching a safety belt and handle portions to be grasped by the climber. The yoke is formed by two half yokes hingedly interconnected and secured by a releasable fastening. Pivoted blades are mounted on the underside of the yoke, the blades being biased to a pole-engaging position and manually retractable. U.S. Pat. No. 4,506,411, dated Mar. 26, 1985, to James R. Ivy, details a "Game Skinning Apparatus". The game skinning apparatus is characterized by a rack having a generally rectangular board with notches formed in each upper corner thereof and a cam pivotally mounted in each of the notches for tightly gripping the extremities of an animal to be skinned, with a variable force that increases with pull strength. A fixed spool and a laterally-shiftable spool are also provided, the latter of which is movable between several spaced positions with respect to the fixed spool, for snugly engaging and holding the neck of the animal to be skinned. A bracket for mounting the rack to a tree or post is also disclosed. A "Fall Arrest Device for Pole Climbers" is detailed in U.S. Pat. No. 4,595,078, dated June 17, 1986, to William E Greenway. The device includes a main yoke provided with resiliently biased arms at each end for partly encompassing a pole. The resiliently biased arms are movable in the same plane as the main yoke and also urge secondary yokes into contact with the pole to accommodate a range of pole diameters. Handles are attached to each arm for gripping by the pole climber to move the arms, so that the fall arrest device can be raised or lowered. Each arm also has eyelets for receiving safety straps attached to the pole climber and in a preferred embodiment the arms have sharp projections for biting into the pole. A pull on the strap due to slippage of the pole climber causes the arms to move toward each other and the sharp projections to bite tightly into the pole.

It is an object of this invention to provide a portable game support which is characterized by a support frame having a pair of legs extending rearwardly in spaced relationship for spanning a vertical support such as a tree or pole, a frame connector spanning the legs for engaging one side of the tree or pole, at least one retainer adjustably attached to the spaced legs for engaging the opposite side of the tree or pole and retaining the support frame on the tree or pole at a selected height and a support frame brace pivotally attached to the support frame and extending downwardly in angular relationship to engage the tree or pole and further stabilize the support frame on the tree or pole.

Another object of the invention is to provide a portable game support which is characterized by a U-shaped support frame having a front frame connector and fitted with spaced rear legs for :panning a tree or pole and a centrally located leg connector for engaging one side of the tree or pole, at least one V-shaped retainer adjustably secured to the spaced legs behind the tree or pole for engaging the opposite side of the tree or pole and further including a support frame brace having one end pivotally attached to the support frame and the opposite end extending downwardly in angular relationship with respect to the support frame for engaging the tree or pole beneath the support frame and cooperating with the centrally located leg connector and the rear retainer, to support the support frame on the tree or pole.

Still another object of this invention is to provide a portable game support for supporting and dressing game, which game support includes a rigid support frame characterized by a pair of side frame members connected at the front end by a front frame connector and having a central frame connector for engaging one side of a tree or pole, and adjustably fitted at the rear end thereof with at least one V-shaped retainer for engaging the opposite side of the tree or pole, the portable game support further including a support frame brace having one end pivotally attached to the support frame and the opposite end engaging the tree or pole beneath the support frame for securing the support frame on the tree or pole at a selected height and an engaging frame for receiving the game and removably mounting on the front end of the support frame.

Still another object of this invention is to provide a portable game support for suspending game above the ground and dressing the game, which portable game support includes a support frame provided with spaced, rearwardly extending legs fitted with a central frame connector for engaging one side of a tree or pole, at least one adjustable, V-shaped retainer for engaging the opposite side of the tree or pole, a support frame brace having one end pivotally attached to the support frame and the opposite end adapted for engaging the tree or pole along with the central frame connector and the retainer, to secure the support frame on the tree or pole at a selected height and further including a pulley assembly removably secured to the support frame for hoisting an engaging frame supporting the game carcass.

Another object of this invention is to provide a portable game support for suspending game from a tree or pole and dressing the game, which portable game support includes a rigid support frame having a pair of spaced, rearwardly-extending legs for spanning the tree or pole, a pair of V-shaped retainers adjustably attached to the legs on opposite sides of the tree or pole for engaging the tree or pole in a scissor-like grip, a support frame brace having one end pivotally attached to the support frame and the opposite end adapted to pivot downwardly in angular relationship with respect to the support frame for engaging the tree or pole beneath the support frame and an engaging frame suspended directly from the support frame or from a companion pulley apparatus by means of an S-hook, for supporting the game to be dressed.

SUMMARY OF THE INVENTION

These and other objects of the invention are provided in a portable game support for suspending and dressing game, which portable game support includes a rigid support frame having a front frame connector and a pair of spaced, rearwardly-extending legs adapted to span a tree or pole at a selected height, a central frame connector joining the legs centrally of the support frame for engaging one side of the tree or pole, a V-shaped retainer adjustably attached to the legs in spaced relationship with respect to the central frame connector for engaging the opposite side of the tree or pole, a support frame brace having one end pivotally attached to the forward end of the support frame and the opposite end fitted with a blade for securely engaging the tree or pole, to stabilize the support frame on the tree or pole, a generally triangular-shaped engaging frame fitted with a pair of spaced frame hooks for receiving the game to be suspended from the support frame, the engaging frame adapted to be suspended from the front frame connector by means of an S-hook in a first game dressing configuration and from a pulley adapted for attachment to the support frame for hoisting the game to the support frame, in a second game dressing configuration.

BRIEF DESCRIPTION OF THE DRAWING

The invention will be better understood by reference to the accompanying drawing, wherein:

FIG. 1 is a top view of a preferred embodiment of the support frame component of the portable game support of this invention;

FIG. 2 is a side view of a typical S-hook used in the support frame illustrated in FIG. 1;

FIG. 3 is a front view of a preferred engaging frame element for use with the support frame illustrated in FIG. 1;

FIG. 4 is a perspective view, partially in section, of the frontal portion of the support frame illustrated in FIG. 1, more particularly illustrating a preferred pivotal mounting of the support frame brace component of the support frame;

FIG. 5 is a side sectional view of a preferred means for adjustably mounting a rear retainer component on the support frame illustrated in FIG. 1;

FIG. 6 is a perspective view of the portable game support mounted in a first functional configuration on a tree with an animal carcass attached to the engaging frame and suspended by means of an S-hook from the support frame illustrated in FIG. 1;

FIG. 7 is a perspective view of the portable game support mounted in a second functional configuration, more particularly illustrating an additional retainer adjustably attached to the support frame for securing the support frame on a tree having a small diameter;

FIG. 8 is a side sectional view of the front end of the support frame illustrated in FIG. 1, with an optional pulley assembly suspended therefrom; and FIG. 9 is a side view of the pulley assembly illustrated in FIG. 8.

DESCRIPTION OF THE PREFERRED EMBODIMENTS

Referring initially to FIGS. 1-5 of the drawing, the portable game support of this invention is generally illustrated by reference numeral 1. The portable game support 1 is characterized by a rigid support frame 2, defined by a pair of side frame members 3 which are welded or otherwise connected at the front end thereof by a front frame connector 8 and at corresponding side frame bends 4 thereof by a central frame connector 5, as illustrated in FIG. 1. A pair of connector braces 6 are welded or otherwise attached to the central frame connector 5 and each of the side frame members 3, in order to stiffen the support frame 2, as further illustrated in FIG. 1. Multiple vertical frame adjusting holes 7 are provided in the spaced, rearwardly-extending ends or legs of the side frame members 3 to adjustably accommodate a V-shaped rear retainer 18, defined by rear retainer legs 19, extending from a rear retainer bend 20. Like the side frame members 3, the rear retainer legs 19 are provided with vertical, spaced leg adjusting holes 21 and a retainer bolt 23 (illustrated in FIG. 5) may be extended through selected ones of the frame adjusting holes 7, located in the side frame members 3 and corresponding aligned leg adjusting holes 21, provided in the rear retainer legs 19, to secure the rear retainer 18 in a selected location on the side frame members 3, as hereinafter further described. A pair of leg blades 22 also project inwardly from the rear retainer legs 19 in spaced relationship for gripping purposes, as hereinafter further described. One end of a support frame brace 10 is provided with a pivot bar 11 and a pair of pivot bar pins 12 are secured to the ends of the pivot bar 11, in order to seat in corresponding pin seats 14, provided in the side frame members 3, and pivotal y secure the pivot bar 11 and the support frame brace 10 to the side frame members 3, as further illustrated in FIGS. 1 and 4 of the drawing. The opposite pivoting end of the brace bar 13 is fitted with a bar base 15, having base blades 16, for engaging a tree or pole, as further hereinafter described.

Referring now to FIGS. 2, 3 and 6 of the drawing, an S-hook 26 is provided for engaging the front frame connector 8 of the support frame 2 and the support bar apex 33 of an engaging frame 28, in order to suspend the engaging frame 28 from the front frame connector 8, as illustrated in FIG. 6. The support bar apex 33 is defined by an A-shaped S-hook support bar 31, the ends of which are welded or otherwise attached to a hook bar 30, fitted with frame hooks 29, for supporting the animal carcass 34. The rear legs of the animal carcass 34 are typically impaled on the respective frame hooks 29, as illustrated in FIG. 6, in order to secure the animal carcass 34 on the engaging frame 28. A bar brace 32 extends between the respective descending portions of the S-hook support ba. 31 for strengthening the engaging frame 28.

Referring again to FIGS. 1-6, the support frame 2 of the portable game support 1 is suspended at a selected height on the tree 9 by initially disassembling the rear retainer 11 from the spaced side frame members 3. This is accomplished by removing the wing nuts 24 from the corresponding retainer bolts 23, illustrated in FIG. 5 The support frame 2 is then positioned on the tree 9 such that the parallel rearwardly-extending portions or legs of the side frame members 3 span the tree 9 and the central frame connector 5 rests against the front side of the tree 9, as illustrated in FIG. 6. The rear retainer 18 is then again positioned on the side frame members 3 with the rear retainer legs 19 and leg blades 22 engaging the opposite side of the tree 9 and the retainer bolts 23 are reinserted in the frame adjusting holes 7 and in registering leg adjusting holes 21 provided in the rear retainer legs 19, to removably secure the portable game support 1 on the tree 9 at a selected height, as illustrated in FIG. 5. The free end of the support frame brace 10 is then pivoted upwardly and the front end of the support frame 2 is lifted slightly, such that the bar base 5 engages the tree 9 beneath the support frame 2 and the base blade 16 penetrates the bark of the tree 9, to further stabilize the portable game support 1 on the tree 9. The engaging frame 28 is then suspended from the S-hook 26 which S-hook 26 has been previously extended over the front frame connector 8 and the animal carcass 34 is lifted into position such that the rear legs thereof are impaled on the frame hooks 9 and the animal carcass 34 is suspended from the frame hooks 29 of the engaging frame 28, as further illustrated n FIG. 6.

Referring now to FIGS. 7, 8 and 9 of the drawings, in another preferred embodiment of the invention the pulley frame 37 of a pulley assembly 36 is designed to engage a pulley support plate 35, attached to the S-hook 26, to suspend the pulley assembly 36 from the support frame 2, as illustrated in FIGS. 8 and 9. The pulley assembly 36 is further characterized by a pulley pin 38, extending through the pulley frame 37 for rotatably mounting a pulley sheave 39, provided with a pulley rope 40. Accordingly, as illustrated in FIG. 7, one end of the pulley rope 40 is attached to the midpoint of the hook bar 30 of the engaging frame 28, the frame hooks 29 are inserted through the rear legs of the animal carcass 3 and the pulley rope 40 is used to hoist the animal carcass 34 upwardly to the support frame 2. The engaging frame 28 is then manually rotated 180° upwardly, such that the support bar apex 33 is fitted onto the S-hook 26 adjacent to the pulley support plate 35, to suspend the engaging frame 28 and the animal carcass 34 from the S-hook 26, as illustrated in phantom in FIG. 7. The pulley assembly 36 can therefore be used to mechanically lift the animal carcass 34 to the height of the support frame 2 without the necessity of manually lifting the animal carcass 34.

Referring again to FIGS. 5 and 7 of the drawing, under circumstances where the tree 9 is very small in diameter, a front retainer 42 which is shaped in the same configuration as the .ear retainer 18 and includes a pair of front retainer legs 43, as well as leg blades (not illustrated), can also be attached to the side frame members 3 by means of spaced leg adjusting holes 21, retainer bolts 23 and wing nuts 24, as illustrated in FIG. 5, to secure the support frame 2 to the tree 9. The scissor-like overlapping of the rear retainer legs 19 and front retainer legs 43 of .he rear retainer 18 and front retainer 42, respectively, enables suspension of the portable game support 1 from a tree of any diameter which is sufficiently strong to withstand the weight of the animal carcass 34 and the portable game support 1.

It will be appreciated by those skilled in the art that the portable game support of this invention can be constructed of substantially any material having sufficient structural strength to support an animal carcass, as described above. However, in a most preferred embodiment of the invention the side frame members 3, support frame brace 10, central frame connector 5 and connector braces 6 are constructed of metal box tubing, while the engaging frame 28 is constructed of metal bar stock. Furthermore, the rear retainer 18 and front retainer 42 may be constructed of flat metal bar stock, angle iron or box tubing, as desired. All joints are preferably welded in the portable game support 1 and the pulley assembly 36 may be characterized by a multiple sheave pulley block and tackle system, as deemed necessary, depending upon the size of the animal carcass 34 to be lifted. Furthermore, while the animal carcass 34 is suspended from the rear legs a illustrated in FIGS. 6 and 7 it is understood that the front legs (not illustrated) can be equally well impaled on the frame hooks 29 of the engaging frame 28, as desired.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A portable game support comprising a pair of side frame members; a front frame connector connecting one end of said side frame members; engaging frame means removably suspended from said front frame connector, said engaging frame means adapted to receive the game and suspend the game at said selected height in spaced relationship with respect to the tree or post; a central frame connector connecting said side frame members in spaced relationship with respect to said front frame connector, said central frame connector positioned to engage one side of the tree or post; and rear retainer means adjustably carried by said side frame members, said rear retainer means positioned to engage the opposite side of the tree post.

2. The portable game support of claim 1 wherein said engaging frame means further comprises an engaging frame and a pair of frame hooks provided on said engaging frame in spaced relationship for receiving the game.

3. The portable game support of claim 1 further comprising hook means carried by said side front frame connector, said hook means adapted for engaging said engaging frame means for removably suspending said engaging frame means from said front frame connector.

4. The portable game support of claim 1 further comprising an S-hook carried by said front frame connector, said S-hook engaging said engaging frame for removably suspending said engaging frame from said front frame connector.

5. The portable game support of claim 1 further comprising a brace pivotally carried by said side frame members, said brace adapted to removably engage the tree or post beneath said central frame connector.

6. The portable game support of claim 5 wherein said engaging frame means further comprises an engaging frame and a pair of frame hooks provided on said engaging frame in spaced relationship for receiving the game.

7. The portable game support of claim 6 further comprising an S-hook carried by said front frame connector, said S-hook engaging said engaging frame for removably suspending said engaging frame from said front frame connector.

8. The portable game support of claim 1 further comprising pulley means carried by said front frame connector, said pulley means adapted to engage said engaging frame means and hoist said engaging frame means and the game into a game dressing configuration.

9. The portable game support of claim 1 further comprising a brace having one end pivotally carried by said side frame members and the opposite end of said brace adapted to removably engage the tree or post beneath said central frame connector.

10. The portable game support of claim 9 further comprising an S-hook carried by said front frame connector, said S-hook engaging said pulley means for removably suspending said pulley means from said front frame connector.

11. The portable game support of claim 1 further comprising front retainer means adjustably carried by said side frame members in overlapping relationship with respect to said rear retainer means, for engaging said one side of the tree or post.

12. The portable game support of claim 11 further comprising a brace having one end pivotally carried by said side frame members and the opposite end of said brace adapted to removably engage the tree or post beneath said central frame connector.

13. The portable game support of claim 12 further comprising an S-hook carried by said front frame connector, said S-hook engaging said engaging frame for removably suspending said engaging frame from said front frame connector.

14. The portable game support of claim 13 comprising a pulley frame carried by said S-hook, a pulley sheave rotatably carried by said pulley frame, a rope extending around said pulley sheave, with one end of said rope secured to said engaging frame for hoisting said engaging frame and the game into a game dressing configuration.

15. A portable game support for attachment to a tree or post and supporting and dressing game, comprising a support frame characterized by a pair of side frame members; a front frame connector connecting one end of said side frame members; a central frame connector connecting said side frame members in spaced relationship with respect to said front frame connector, said central frame connector positioned to engage on: side of the tree or post; rear retainer means adjustably carried by the opposite end of said side frame members, said rear retainer means positioned to engage the opposite side of the tree or post and secure said support frame on the tree or post; a support frame brace having one end pivotally carried by said side frame members and the opposite end of said support frame brace adapted to removably engage the tree or post beneath said central frame connector; an engaging frame adapted for removable attachment to said front frame connector and having a pair of spaced frame hooks for receiving and supporting the game.

16. The portable game support of claim 15 further comprising an S-hook carried by said front frame connector, said S-hook engaging said engaging frame for removably suspending said engaging frame from said front frame connector.

17. The portable game support of claim 16 further comprising a pulley frame carried by said S-hook, a pulley sheave rotatably carried by said pulley frame, and a rope extending around said pulley sheave, with one end of said rope secured to said engaging frame for hoisting said engaging frame and the game into a game dressing configuration.

18. A portable game support for removable and adjustable attachment to a tree or post and supporting and dressing game, comprising a support frame characterized by a pair of spaced side frame members; a front frame connector connecting one end of said side frame members; a central frame connector connecting said side frame members in spaced relationship with respect to said front frame connector; a V-shaped front retainer adjustably positioned on said side frame members for engaging one side of the tree or post; a V-shaped rear retainer adjustably positioned on said side frame members on the opposite side of said tree or post from said V-shaped front retainer, for engaging the opposite side of the tree or post a brace having one end pivotally carried by said side frame members and the opposite end of said brace adapted to removably engage the tree or post beneath said central frame connector; and a generally triangular-shaped engaging frame and a pair of frame hooks provided on said engaging frame in spaced relationship for receiving and supporting the game.

19. The portable game support of claim 18 further comprising an S-hook carried by said front frame connector, said S-hook engaging said engaging frame for removably suspending said engaging frame from said front frame connector.

20. The portable game support of claim 19 further comprising a pulley frame carried by said S-hook, a pulley ;heave rotatably carried by said pulley frame, and a rope extending around said pulley sheave, with one end of said rope secured to said engaging frame for hoisting said engaging frame and the game into a game dressing configuration.

* * * * *